United States Patent [19]

Rice

[11] 4,025,912
[45] May 24, 1977

[54] METHOD AND APPARATUS FOR REMOTELY TRANSDUCING AND TRANSMITTING PRESSURE AND TEMPERATURE CHANGES

[75] Inventor: John H. Rice, Cumberland, Md.

[73] Assignee: The United States of America as represented by the Secretary of the Navy, Washington, D.C.

[22] Filed: July 19, 1976

[21] Appl. No.: 706,656

[52] U.S. Cl. ........................... 340/189 M; 340/200; 102/34

[51] Int. Cl.² ........................................ G08C 19/10

[58] Field of Search .......... 340/189 M, 200, 152 T

[56] References Cited

UNITED STATES PATENTS 3,530,449  9/1970  Anderson ...................... 340/189 M
3,651,405  3/1972  Whitney ........................ 340/189 M
3,713,124  1/1973  Durland ........................ 340/189 M Primary Examiner—Thomas B. Habecker
Attorney, Agent, or Firm—Richard S. Sciascia; Paul N. Critchlow

[57] ABSTRACT

A capacitance-type transducer capsule is placed in a remote environment for exposure to its changing physical conditions. A energy pick-up coil in the capsule receives a remotely-generated signal which is converted to DC power for chargeably establishing the capacitance and for driving a tank circuit which includes the capacitance as the only variable. Changes in pressure, temperature, etc. produce linear variations in the capacitance to modulate the oscillations of the tank circuit and produce a transmittable signal frequency containing the sensed information.

9 Claims, 6 Drawing Figures

METHOD AND APPARATUS FOR REMOTELY TRANSDUCING AND TRANSMITTING PRESSURE AND TEMPERATURE CHANGES

BACKGROUND OF THE INVENTION

The present invention generally relates to pressure and temperature transducers and, in particular, to capacitance-type transducer systems for remotely sensing and transmitting variable environmental conditions.

Pressure and temperature transducer systems are well known but, for the most part, the systems have not employed variable capacitors as the operative element. In particular, as has been noted, the present invention primarily is concerned with deriving information from remote or inaccessible positions and, also, with the use of a capacitance-type sensor for this purpose. For example, the present system is particularly concerned with monitoring pressure and temperature of a solid propellant charge of a rocket motor over relatively long periods of time. To accomplish this purpose, transducer capsules are embedded or implanted within the high modulus propellant material. Such a situation is considered to be a remote or inaccessible since, for certain reasons the capsule must be physically unconnected with external power sources or, in other words, must have no electrical coupling power lines. Direct electrical coupling or wires are avoided because they provide a path for temperature dissipation and for pressure leakage. In addition, they reinforce the propellant grain, augment burning rate and produce added stress perturbation.

The need for direct electrical coupling is avoided by the use of what will be termed a 'wireless' pressure and temperature transducer that is powered by telemetry links. As far as is known, such systems have not been successfully developed although the reasons for the absence of such developmental work can only be surmised. One problem, however, is that capacitive transducers entail certain difficulties particularly when there is a need to provide a relatively simple and inexpensive system characterized both by a high output level and a output which varies linearly with the sensed variations. Because of the remote disposition of the sensor, high output clearly is desirable. Linearity is important since non-linear outputs require relatively complex and expensive computer arrangements to derive the desired information.

Generally considered, the present invention involves transmitting a signal frequency to a remotely-disposed transducer which, in preferred form, is contained in a capsule deeply embedded in a solid substance such as the previously-discussed propellent charge. Other applications, of course, are contemplated. The transducer of the system includes a variable capacitor exposed to the environment to vary its capacitance with such changing physical conditions as pressure and temperature variations. An inductor carried by the transducer derives the DC power of the transmitted signal and employs this power both to charge the capacitor and to drive a tank circuit that contains the variable capacitance. The tank circuit oscillation provides a transmittable signal frequency receivable at a monitoring center or control station. Since the tank circuit capacitance is the only variable, the oscillations are modulated by the varying capacitance to provide the desired information.

One object of the invention is to provide a so-called 'wireless' transducer system for measuring environmental physical condition changes such as pressure and temperature variations.

Another object is to provide pressure and temperature sensing devices based on capacitance change principles which are linked to telemetry systems for both input power and output data transmittal.

A further object is to provide a telemetry-linked transducer system especially adapted for monitoring pressure and temperature changes within a solid propellant charge of a rocket or the like. Other objects will become apparent in the ensuing description.

BRIEF DESCRIPTION OF THE DRAWINGS

The present invention is illustrated in the accompanying drawings of which.

DETAILED DESCRIPTION OF THE INVENTION

Figure 1:
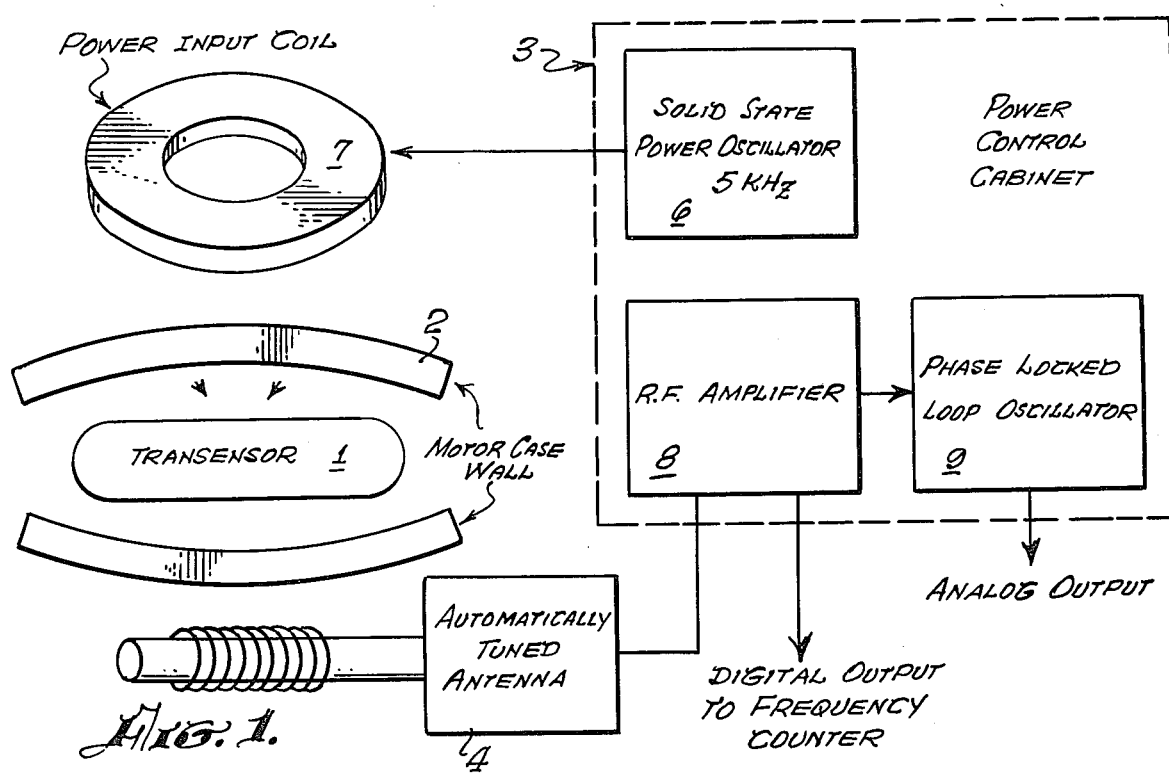
FIG. 1 is a schematic generally illustrating the operation of the present system.
Figure 2:
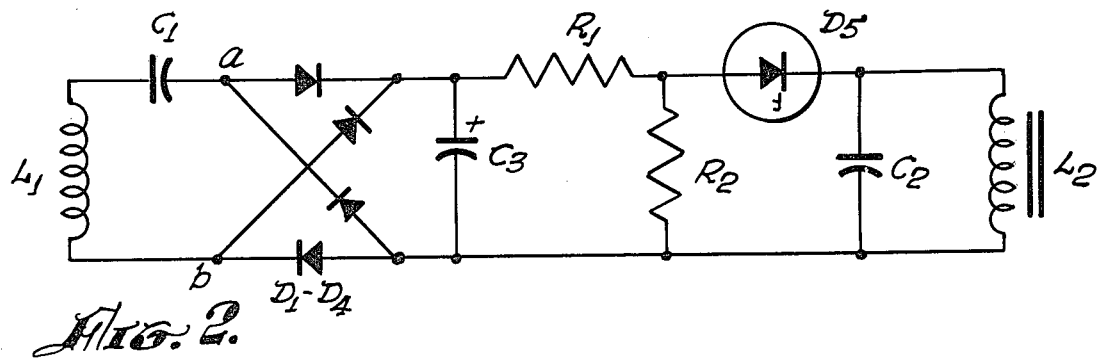
FIG. 2 is a circuit diagram of the electronics incorporated in the transducer capsule of the system.

The present transducer system has been developed principally for use in capsule form in a solid propellant charge of a rocket motor to permit continuous monitoring of the pressure and temperature conditions of the propellant. Monitoring is needed for a variety of purposes including the detection of propellant gasing, the determination of propellant cure time, the detection of propellant cracks and case bomb failures and other uses some of which still are under consideration. Consequently, the description of the invention will be specifically with reference to such a propellant charge application although it will be readily apparent that many other uses are possible. Also, the description of the transducer mechanism used in the system will be reference to particular pressure and temperature transducers which also have been developed primarily for use in the monitoring of the propellant charges or other material. However, these particular transducers are intended as illustrative examples and others can be substituted. FIGS. 1 and 2 diagramatically illustrate the system itself while the other Figures show the particular pressure and temperature transducers used in the systems.

Referring to FIG. 1, transducer 1, as shown, is embedded or implanted in a solid propellant charge of a rocket motor having a motor case wall 2, and, as will be noted, it is identified by the term 'transensor'. This term is considered appropriate since the transducer functions both as a receiver and transmitter as well as being a sensing device. In particular, the transensor receives a telemetered signal from a support system 3 and utilized the power in the signal to drive an oscillator arrangement the oscillation of which is detected by a tuned antenna 4 of the support system. The support system includes a solid state power oscillator 6 having a power input coil 7 excited by a 5 KHz oscillator to generate the signal picked up by the transensor. In turn, the power of the signal drives a transensor oscillator to produce the signal picked up by antenna 4 which is applied to an R.F. amplifier 8 which produces a digital output for a frequency counter. An analog output also can be obtained through a phase-lock loop oscillator 9. Although the present system can operate through any desired telemetry linkage, the particular support system illustrated is highly advantageous for use in monitoring applications such as the monitoring of propellant charges. In particular, it is a reliable, compact and portable system in which preferably, the power input coil and the receiver are coupled together to operate as a unit. Also, several transensors can be operated one power input coil and receiver. In the preferred form, the support system cabinet also houses logic circuits which allow the receiver to automatically track and stay tuned to the linking frequency of the transensor. The feature of providing both analog and digital data presentation easily lends itself to automatic fault-sensing operation. Systems such as are shown are in daily operation with up to ten transensors functioning from one power control system. The output of each of the ten transensors can be recorded automatically in digital form every 20 seconds or the output from one transensor recorded every 2 seconds. Constant analog monitoring also is possible. In a contemplated development, a computer controlled data handling system will store calibration data on each of the transensors. Also, automatic transensor control systems at several locations will take data from any number of transensors deployed in any number of motors. The raw data then can be transmitted over land lines to the computer where it will automatically be reduced to engineering units and put on file for later analysis.

Transensor 1, is a sensor functioning on capacitance principles to sense pressure and temperature changes and relay this information over a telemetry link to the support system receiver. FIG. 2 diagramatically illustrates the electronics incorporated in each transensor. Since the electronics include only 12 components it obviously provides a unique simplicity which contributes to reliability. An inductance loop formed of a coil L1 and a capacitor C1 is provided to receive the signal frequency transmitted by power oscillator 6 of the system support cabinet. Preferably the loop is tuned to the 5 KHz signal for minimum power requirement as well as for maximum isolation from other power sources. The induced voltage is rectified and filtered by a diode bridge D1–D4 and by another capacitor C3. The resulting DC voltage is supplied as operating power for the oscillator section of the transensor. A voltage divider identified in FIG. 2 as R1 and R2 provides the proper bias voltage for a tunnel diode D5 so that it will support the oscillation on the tank circuit C2 and L2 without influencing its operating frequency. As is to be particularly noted, capacitor C2 of the tank circuit is intended to be the capacitance of the sensor itself or, in other words, the capacitance which, in the manner to be described, is responsively varied by the changing pressure and temperature conditions. Thus, as will be appreciated, C2 is a calibrated capacitance the value of which is fixed by the capacitor arrangement of the transensor so that the sensed environmental changes vary the capacitance to modulate the oscillator frequency and provide an output frequency detected by tuned antena 4. More specifically, the frequency of the oscillator is controlled by the inductance coil and the variable capacitance of the sensor's plates. However, since the inductance of the coil is fixed, C2 is the only variable in the circuit so that the oscillations vary responsively with the sensed conditions.

Obviously, these transensors can be provided in a variety of manners, However, for presently intended uses, the transensors illustrated in FIGS. 3–6 will be found particularly advantagous since they are capable of providing an output signal that is linearly proportional to the sensed environmental conditions and, further, are capable of providing high output signal levels.

Figure 3:
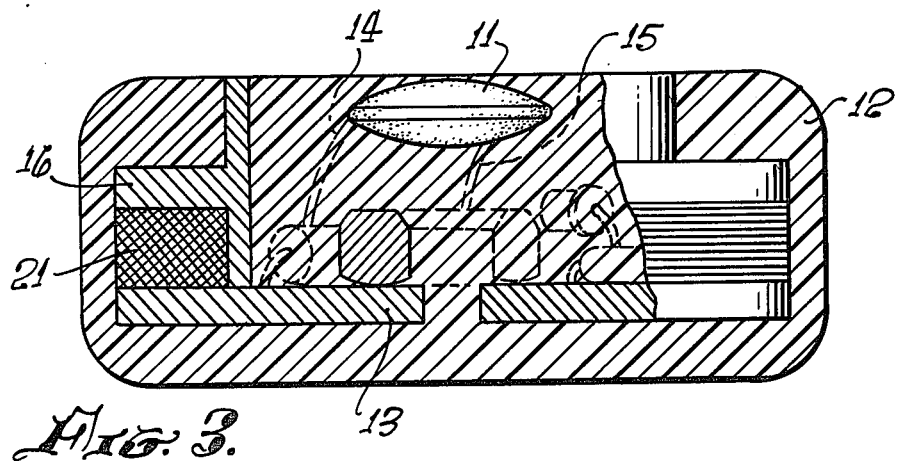
FIG. 3 is a sectional view of a special capsule-mounted temperature sensor used in the system.
Figure 4:
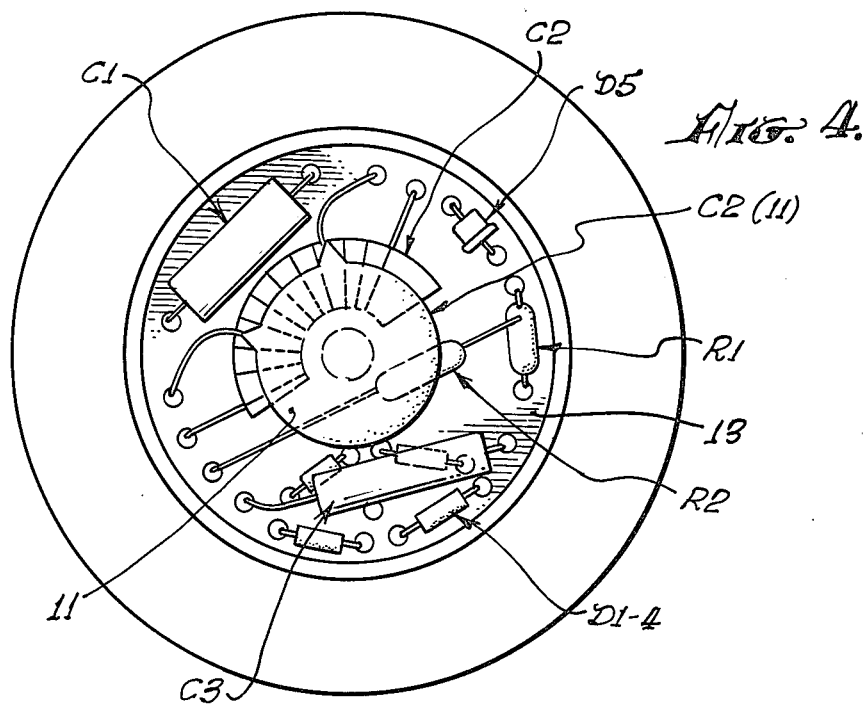
FIG. 4 is a somewhat diagrammatic plan view showing a component arrangement of the FIG. 3 sensor.

FIGS. 3 and 4 illustrate a temperature sensitive transducer in which the capacitance of capacitor C2 of FIG. 2 is provided by a temperature-sensitive capacitor 11. Various temperature-sensitive capacitors suitable for the present purposes are commercially available. However, it presently is preferred to use a 300 pf capacitor manfactured by Radio Material Company and known as RMC DISC CAP. When exposed to environmental temperature changes, this particular capacitor has a 4700 ppm capacitance change per degree of temperature and the capacitance change is linearly proportional to the temperature changes. As shown in FIG. 3, capacitor 11 is potted in a capsule casing 12 in which it is exposed to the environment. Capsulation may be accomplished by using Emerson Cumming 2651 potting compound using a vacuum casting procedure. The electronic components identified in FIG. 2 are mounted in the capsule in the manner shown in FIGS. 3 and 4. In particular, the components are mounted on a printed circuit board 13 into which leads 14 and 15 of the capacitor are connected. Tuning coil L1, which is mounted between a coil spool 16 and the circuit board, can be a coil of 2500 turns AWG no. 40 coded with Emerson Cumming 2651. Other circuit values are as follows: D5 — General Electric tunnel diode (IN3712 ), R2 — 300 ohms, R1—150 ohms, C3—6.85 micro farad, D1–4 — General Electric diodes (IN4534 ), C1–6800 pf, L2 15–30 turns AWG no. 28 on bisected toroid. The operation of the temperature sensitive transducer or transceiver is such that the DC voltage derived from the inductance is used to charge capacitor 11, or C2, to enable sensed temperture variations to vary the capacitance and modulate the oscillations of the tank circuit. The received power also is used to drive the data transmitting oscillations.

Figure 5:
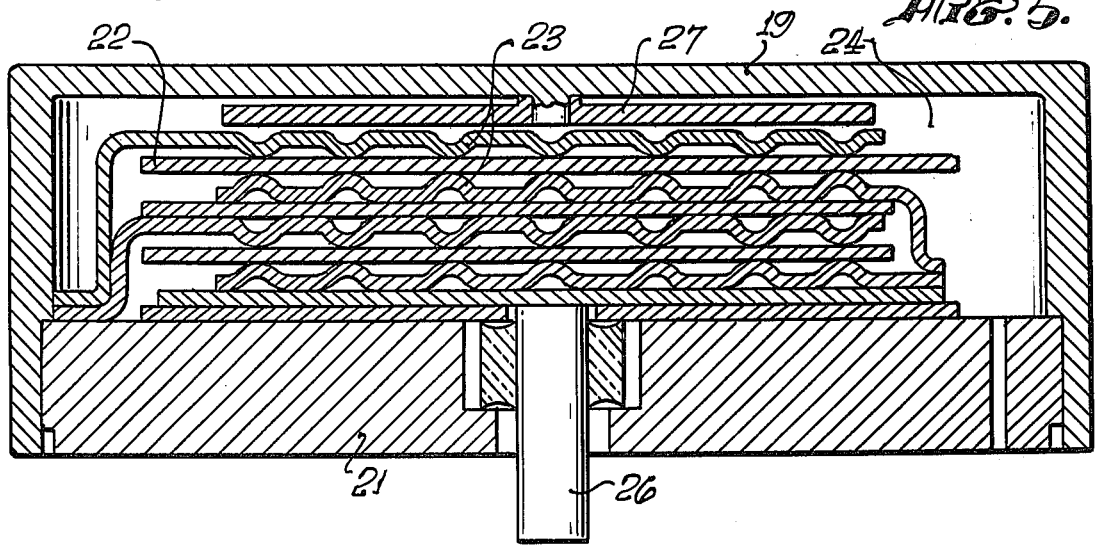
FIG. 5 is a sectional view of a particular pressure transducer.
Figure 6:
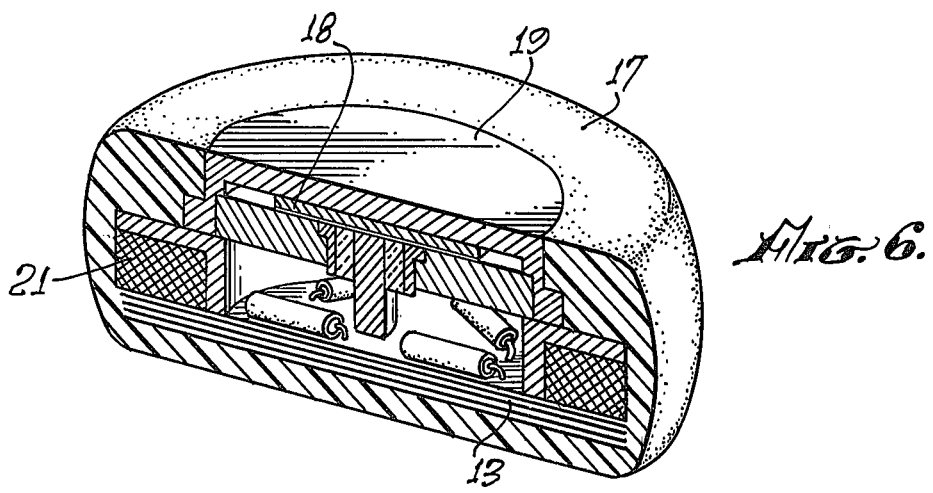
FIG. 6 is a vertical section of the FIG. 5 transducer mounted in a capsule.

The pressure transducer arrangement is shown in FIGS. 5 and 6. With reference to FIG. 6, it will be seen that the pressure transducer also is in capsule form having a casing 17 enclosing a stack of capacitors plates 18 which provided the capacitance of C2 of FIG. 2. The electronic components and the circuitry used for generating the power for driving capacitor 18 as well as the oscillator section is precisely the same as shown in FIG. 2. The components also are mounted on a similar circuit board 13 and, preferably, the capsule interior is evacuated and filled with an inert gas such as nitrogen. Changing pressure conditions are sensed by a diaphragm 19 a portion of which is exposed to the capsule environment and, of course, the diaphragm movements are imparted to the capacitor plates to vary the capacitance.

FIG. 5 illustrates some special features of the pressure sensitive transducer which permit the transducer output to be linearly proportional to the pressure changes and also provide a high signal output level. It is, however, to be noted that the particular arrangement shown in FIG. 5 constitutes the subject matter of a co-pending application entitled "A Temperature Compensated, High Pressure Transducer Based on Capacitance Change Principles", presently identified as Navy Case 59548. As shown, the arrangement includes a relatively thick and stiff base plate 21 on which are mounted a plurality of capacitor plates 22 having mica sheets separating the plates and also having embossed surfaces or pips 23 which maintain an initial plate separation and also act as spring members when the plates are depressed by diaphragm 19. Diaphragm 19 is a U-shaped member fitted closely to base plate 1 and having an interior reference cavity or chamber 24 in which the plates are mounted. The plate charge is translated to two of the plates by base plate 21 while the other two plates are charged through a pin 26 which is insulated from the base plate.

A principle feature of this arrangement is the use of a so-called load piston 27 centrally carried by diaphragm 19 and bearing against the upper most plate of the capacitor stack. Load piston has several distinct advantages. First, it can be sized to exert a particular depressing pressure on the capacitor stack so that, in effect, the spacing pips of the plates are flattened to cause the initial plate spacing to be set with precision. The purpose of pressurizing the plates with the load piston is to assure that the plate movements responsive to the sensed pressure changes are within the linear range of the variable capacitance. As is known, the capacitance of capacitor plates will vary lineraly within a particular limited range. Beyond that range, the capacitance becomes non-linear with respect to plate movement. By precisely setting the plate spacing, the range of plate movements can be limited to the linear portion. As will be recognized, this predetermination of the plate movement requires that the range of anticipated pressures to be experienced by the capsule is a known factor. In practice, instruments differing range limits can be provided to accomodate the differing pressures. The thickness and softness or compliancy of the diaphragm also can be tailored to anticipated situations. Another advantage of the load piston is that it transmits the diaphragm pressure evenly across the entire surface of the capacitor plates so that the plates move evenly in response to the pressure rather than moving with a flexing action. Abviously, any flexing of the capacitor plates which might occur without the pressure of the load piston would result in an uneven distribution of the capacitance variation. The use of such a load piston provides a ultra-high output particularly when relatively soft diaphragms are used and it also makes it possible to provide a transducer with a diaphragm deflection rate as low as 0.6 micro inch per psi while maintaing high gage output and good stability.

In addition to increasing the output from the transducers, the load piston provides a method for temperature compensation. Temperature-caused dimensional changes in the cylindrical section of the gage which would cause capacitance change are compensated for by machining the load piston from a material which has a higher coefficient of thermal expansion than that from which the body of the transducer is machined. As has been stated, the load piston arrangement is the subject matter of a co-pending patent application and further details regarding its structure and operation are disclosed in that application. Basically, however, the arrangement provides both a high signal output and a linear output as well as permits temperature compensation. It is particularly useful in the monitoring of propellant charges.

The transducer arrangements that have been described are especially advantageous for use in applications comparable to the presently-contemplated propellant monitoring function. However, the invention is more directly concerned with the provision of a system for remotely sensing the variations in the physical conditions of particular environments. In particular, the system provides a highly useful method for remotely sensing pressure and temperatuer changes. The capability of linking capacitance-type sensors to telemetry is a significant factor in that it permits the embedding of transducer capsules in a solid material and, nevertheless, assures a strong output signal level in which there is a linear relation to the sensed information. Further, as has been noted, the beneficial results are achievable in a relatively simple and inexpensive device which is highly reliable over long periods of use.

Obviously many modifications and variations of the present invention are possible in the light of the above teachings. It is therefore to be understood that within the scope of the appended claims the invention may be practiced otherwise than as specifically.

I claim:

1. A method for sensing and transmitting environmental temperature and pressure conditions comprising:
    disposing a signal-receiving and signal generating capacitive transducer in said environment,
    radiatively transmitting an electro-magnetic signal to said transducer,
    utilizing said transmitted signal power for establishing said transducer capacitance and for driveably generating a remotely-receivable oscillating signal frequency,
    varying said established capacitance responsively to said environmental conditions, and
    varying said oscillating frequency responsively to said capacitance variations,
    whereby said temperature and pressure information is obtainable at a remote location by transmitting said signal to said transducer and receiving its condition-responsive oscillating frequency.

2. The method of claim 1 wherein said oscillating frequency varies linearly with said capacitance variations.

3. Implantable transensor apparatus for sensing and transmitting environmental temperature and pressure conditions comprising:
    capacitive sensor means for sensing said conditions and producing a condition-responsive capacitance,
    means for receiving a remotely-radiated electro-magnetic signal frequency and producing its DC voltage,
    oscillator means for generating a remotely-receivable signal frequency, said condition-responsive sensor capacitance being included in said oscillator means for varying said generated signal frequency responsively to said sensed conditions, and
    circuit means coupling said DC voltage to said capacitive sensor means for electrically establishing its capacitance and to said oscillator means for driveably generating said oscillator signal frequency,
    whereby said transensor apparatus can be implanted in an environment and its temperature and pressure conditions can be remotely monitored by transmitting a signal to the transensor and receiving said condition-responsive oscillating frequency.

4. The apparatus of claim 3 wherein said means for receiving said remotely-generated signal is an inductor coil tuned to its frequency.

5. The apparatus of claim 4 wherein said oscillator means includes a tank circuit that includes said sensor capacitance.

6. The apparatus of claim 5 wherein said oscillator means further includes a tunnel diode biased by said DC voltage for supporting said tank circuit oscillation.

7. The apparatus of claim 3 wherein said capacitance varies linearly with said sensed conditions.

8. The apparatus of claim 7 wherein said sensor means is a pressure transducer.

9. The apparatus of claim 8 wherein said sensor means is a temperature transducer.

* * * * *